(12) United States Patent
McIntyre et al.

(10) Patent No.: US 9,331,570 B2
(45) Date of Patent: May 3, 2016

(54) SWITCHING CIRCUIT INCLUDING DC-DC CONVERTER COOPERATING WITH A HIGH VOLTAGE SUPPLY AND RELATED METHODS

(71) Applicant: HARRIS CORPORATION, Melbourne, FL (US)

(72) Inventors: John Robert McIntyre, Rochester, NY (US); John Paul Shoots, Palmyra, NY (US); Gary Anton Schwenck, Webster, NY (US)

(73) Assignee: HARRIS CORPORATION, Melbourne, FL (US)

( * ) Notice: Subject to any disclaimer, the term of this patent is extended or adjusted under 35 U.S.C. 154(b) by 134 days.

(21) Appl. No.: 14/451,957

(22) Filed: Aug. 5, 2014

(65) Prior Publication Data

US 2016/0043638 A1 Feb. 11, 2016

(51) Int. Cl.
*H01P 1/10* (2006.01)
*H02M 3/155* (2006.01)

(52) U.S. Cl.
CPC .................................... *H02M 3/155* (2013.01)

(58) Field of Classification Search
CPC ............... H01P 1/10; H01P 3/08; H03H 7/38; H02M 3/156
USPC ......... 323/229, 232, 271, 282–290, 351, 220, 323/223; 333/103, 81 R, 101
See application file for complete search history.

(56) References Cited

U.S. PATENT DOCUMENTS 4,883,984 A 11/1989 Kess
7,129,805 B2 * 10/2006 Marion ..................... H01P 1/15 333/103

FOREIGN PATENT DOCUMENTS

EP 0300261 A1 1/1989

OTHER PUBLICATIONS

Hewlett Packard, "Broadbanding the Shunt PIN Diode SPDT Switch," Application Note 957-1, Agilent Technologies, 1996, USA, 3 pgs.

* cited by examiner

*Primary Examiner* — Gary L Laxton
*Assistant Examiner* — Kyle J Moody
(74) *Attorney, Agent, or Firm* — Allen, Dyer, Doppelt, Milbrath & Gilchrist, P.A.

(57) ABSTRACT

A switching circuit may include a first series diode, a second series diode, a first shunt diode coupled to the first series diode at a first control node, and a second shunt diode coupled to the second series diode at a second control node. A high voltage supply may generate a high voltage signal to be selectively applied to either the first or second control node. A dc-dc converter may cooperate with the high voltage supply to generate an intermediate bias voltage on the first and second shunt diodes so that the first series diode is reversed biased and the first shunt diode is forward biased when the high voltage control signal is applied to the first control node, and so that the second series diode is reversed biased and the second shunt diode is forward biased when the high voltage control signal is applied to the second control node.

28 Claims, 3 Drawing Sheets

SWITCHING CIRCUIT INCLUDING DC-DC CONVERTER COOPERATING WITH A HIGH VOLTAGE SUPPLY AND RELATED METHODS

TECHNICAL FIELD

The present application is directed to electronic circuits, and more particularly, to switching circuits and related methods.

BACKGROUND

A diode, such as a PIN diode, may be particularly useful as a radio frequency (RF) switch. One example PIN switch configuration is a series-shunt configuration. A series-shunt configuration of PIN diode switches is typically used to achieve a relatively high isolation, which may be particularly important in high frequency applications, for example at or above 1 GHz.

To achieve the relatively high isolation in a high power application, for example >10 W, a relatively high reverse bias voltage is used. The series diode and shunt diode of a particular switched path must be forward and reversed biased complementarily to minimize insertion loss and maximize isolation. DC blocking capacitors are often placed between the series and shunt diode to allow RF to pass freely and facilitate the independent DC biasing with low-voltage forward bias supplies. DC blocking capacitors, for example, allow for relatively low DC power consumption, but are less efficient in terms of using more discrete components, consuming printed circuit board (PCB), and diminishing isolation at higher frequencies.

Alternatively, to forward bias the shunt diodes, the shunt diode forward bias current may come from a relatively high voltage supply. While using a relatively high voltage supply decreases PCB space with respect to the DC blocking capacitors and has relatively good isolation at higher frequencies, static DC power consumption is high.

Packaged series-shunt PIN diode switches may provide increased thermal performance and higher isolation. However, packaged series-shunt PIN diode switches are generally not available with DC blocking capacitors isolating the series and shunt diodes.

SUMMARY

A switching circuit may include a first series diode, and a second series diode. The switching circuit may also include a first shunt diode coupled to the first series diode at a first control node, and a second shunt diode coupled to the second series diode at a second control node. A high voltage supply may be configured to generate a high voltage control signal to be selectively applied to either the first or second control node. The switching circuit may also include a dc-dc converter that cooperates with the high voltage supply to generate an intermediate bias voltage on the first and second shunt diodes so that the first series diode is reversed biased and the first shunt diode is forward biased when the high voltage control signal is applied to the first control node, and so that the second series diode is reversed biased and the second shunt diode is forward biased when the high voltage control signal is applied to the second control node. Accordingly, the switching circuit may increase efficiency, for example, by reducing power consumption and increasing isolation.

The first and second series diodes may be coupled in back to back relation defining an input port therebetween. A first output port may be coupled to the first control node for a first frequency band, and a second output port coupled to the second control node for a second frequency band different than the first frequency band, for example.

The dc-dc converter may be an isolated dc-dc converter, for example. The intermediate voltage may be less than 25% of the high voltage control signal. The high voltage control signal may be greater than 20 volts. The intermediate bias voltage may be less than 10 volts, for example.

The first and second shunt diodes may each include a PIN shunt diode. The first and second series diodes may each include a PIN series diode.

The first shunt diode and the first series diode may be coupled in an anode-to-cathode configuration. The second shunt diode and the second series diode may be coupled in an anode-to-cathode configuration.

The switching circuit may further include at least one first filter circuit between the first shunt diode and the dc-dc converter. At least one second filter circuit may be between the second shunt diode and the dc-dc converter, for example.

A method aspect is directed to a method of using a switching circuit that includes a first shunt diode coupled to a first series diode at a first control node and a second shunt diode to a second series diode at a second control node. The method may include generating an intermediate bias voltage, from a dc-dc converter cooperating with a high voltage supply, on the first and second shunt diodes so that the first series diode is reversed biased and the first shunt diode is forward biased when a high voltage control signal is selectively applied to the first control node by the high voltage supply and so that the second series diode is reversed biased and the second shunt diode is forward biased when the high voltage control signal is selectively applied to the second control node.

DETAILED DESCRIPTION

The embodiments will now be described more fully hereinafter with reference to the accompanying drawings, in which preferred embodiments are shown. The embodiments may, however, be in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
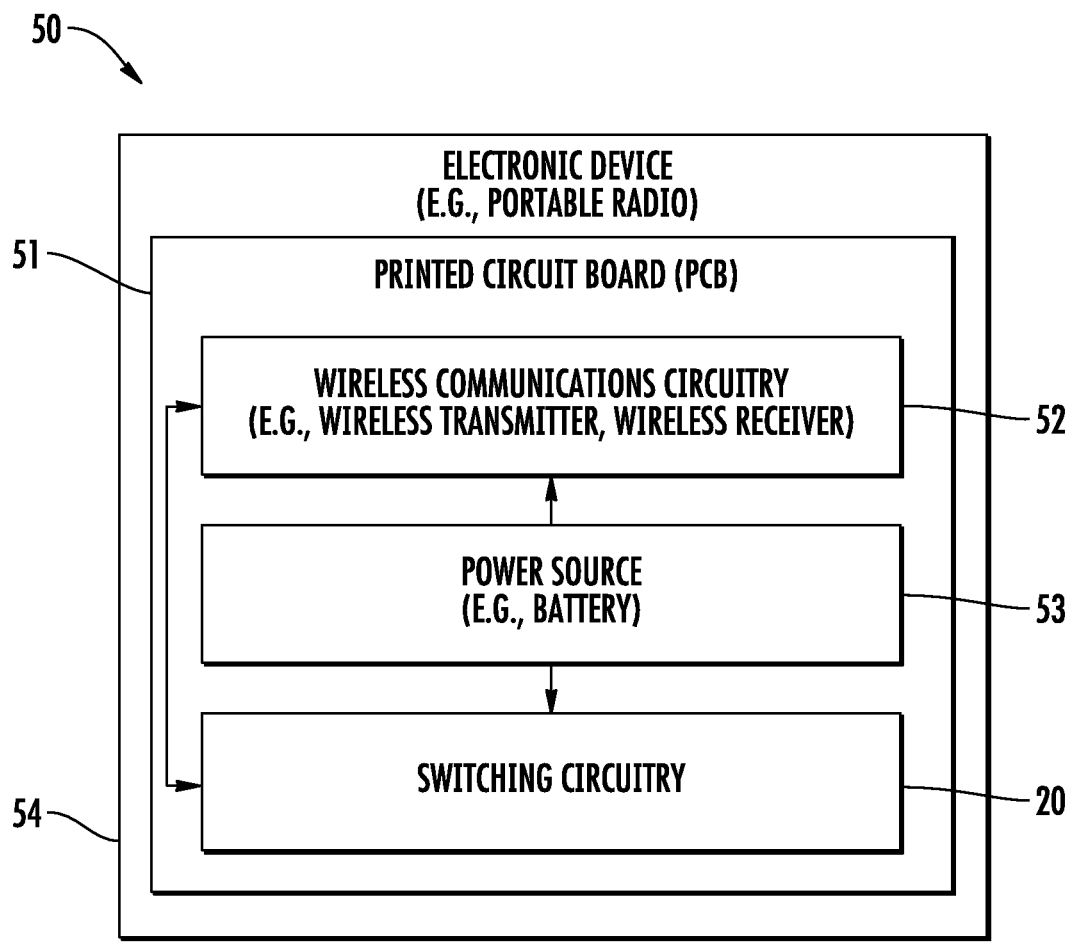
FIG. 1 is a schematic block diagram of an electronic device including a switching circuit in accordance with the present invention.

Referring initially to FIG. 1, an electronic device 50 may include a housing 54 and a printed circuit board (PCB) 51. The electronic device 50 may be in the form of a portable radio, for example. The electronic device 50 may include wireless communications circuitry 52 carried by the PCB 51. In some embodiments, the wireless communications circuitry 52 may include a wireless transmitter and/or wireless receiver. A power source 53, for example, a battery, is coupled to the wireless communications circuitry. Switching circuitry 20 is also carried by the PCB 51 and is coupled to the wireless communications circuitry 52. The switching circuitry 20 may be particularly advantageous for switching between different frequency bands, for example, when the wireless communications circuitry 52 communicates across multiple frequency bands, as will be appreciated by those skilled in the art. Exemplary frequency bands may include ITU bands, VHF/UHF, or IEEE VHF/UHF/L-Bands, for example, or a sub-band thereof that accommodate filters intended to pass a range of frequencies, but that may stop their harmonics (harmonic filter bands). Additional components may be carried by the housing 54 and/or the PCB 51 and coupled to the wireless communications circuitry 52 and switching circuitry 20.

Figure 2:
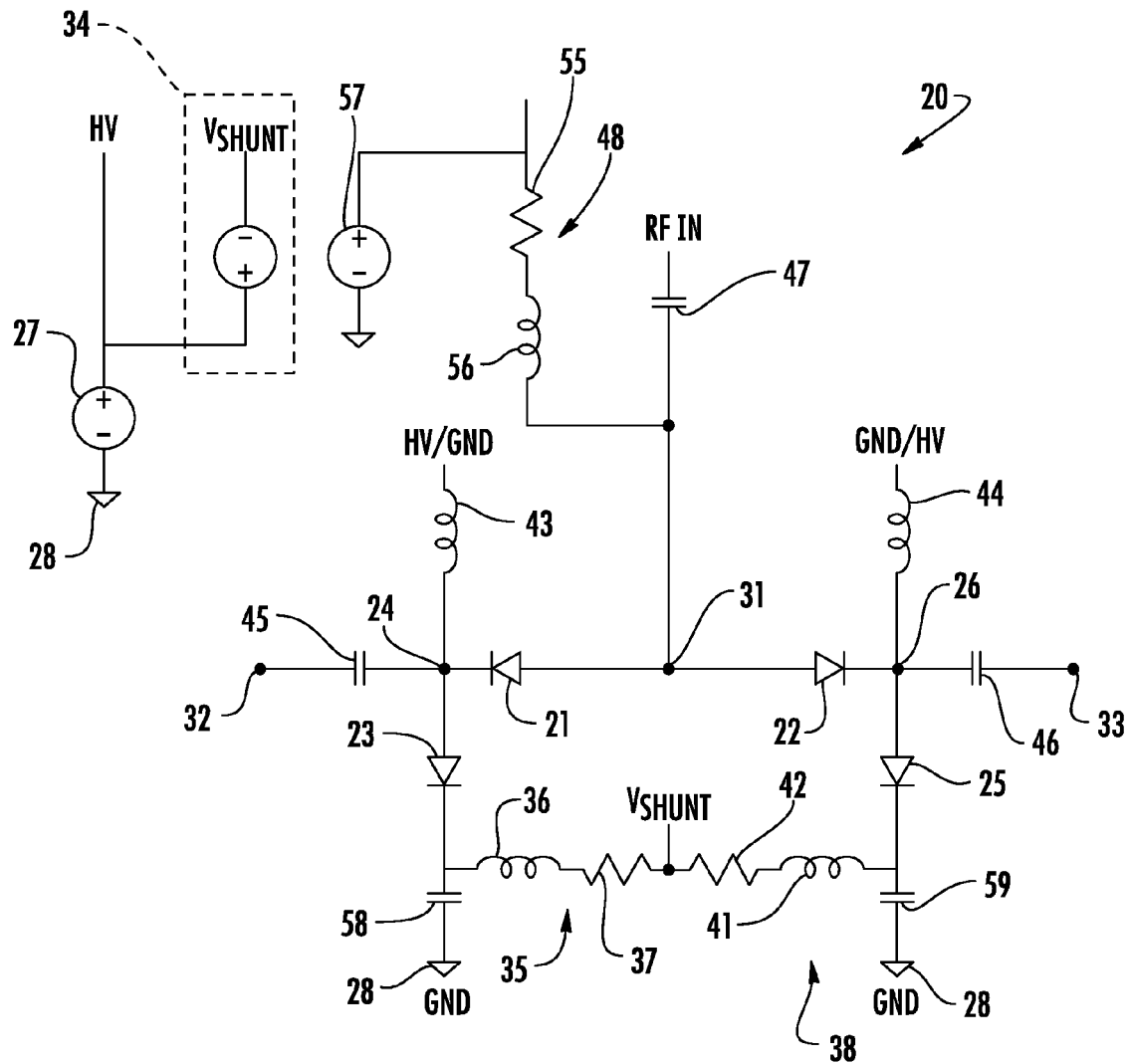
FIG. 2 is schematic circuit diagram of the switching circuit of FIG. 1.

Referring now additionally to FIG. 2, the switching circuit 20 includes a first series diode 21 and a second series diode 22. The first and second series diodes 21, 22 are each a PIN diode. The first and second series diodes 21, 22 are also coupled in back to back relation defining an input port 31 therebetween. A radio frequency (RF) signal is input at the input port 31.

A first shunt diode 23 is coupled to the first series diode 21 at a first control node 24. A second shunt diode 25 is coupled to the second series diode 22 at a second control node 26. Similar to the first and second series diodes 21, 22, the first and second shunt diodes 23, 25, are also PIN diodes. The first and second shunt diodes 23, 25 are each coupled to a voltage reference 28, for example, a circuit ground. Illustratively, a respective capacitor 58, 59 is between each of the first and second shunt diodes 23, 25 and the voltage reference 28. Of course, additional capacitors may be included, for example, that block DC passing (shunting) RF to ground.

The first shunt diode 23 and the first series diode 21 are coupled in an anode-to-cathode configuration. Similarly the second shunt diode 25 and the second series diode 22 are coupled in an anode-to-cathode configuration.

A first output port 32 is coupled to the first control node 24 for a first frequency band. A second output port 33 is coupled to the second control node 26 for a second frequency band different than the first frequency band. Of course, additional frequency bands may be included, for example, by adding third series and shunt diodes and configuring a respective circuit, for example, a filter, an amplifier, an antenna, and/or other circuitry as will be appreciated by those skilled in the art.

A high voltage supply 27 is configured to generate a high voltage control signal HV to be selectively applied to either the first or second control node 24, 26. For example, the high voltage supply 27 may generate the high voltage control signal HV to be greater than 100 volts, for example. For a relatively high power application, for example greater than 50 W, it may be desirable for the high voltage control signal HV to be about 200 volts, for example. Of course, the high voltage control signal HV may be another voltage, for example, greater than 20 volts.

The voltage at each of the first and second control nodes 24, 26 alternates between the high voltage control signal HV and the reference voltage GND at voltage reference 28. In other words, when the voltage at the first control node 24 is the high voltage control signal HV, the second control node 26 may be at the reference voltage GND, and when the voltage at the first control node is at the reference voltage GND, the voltage at the second control node may be the high voltage control signal HV. A respective first and second inductor 43, 44 may be coupled to the first and second control nodes 24, 26.

A dc-dc converter 34 cooperates with the high voltage supply 27 to generate an intermediate bias $V_{shunt}$ voltage on the first and second shunt diodes 23, 24 so that the first series diode 21 is reversed biased and the first shunt diode is forward biased when the high voltage control signal is applied to the first control node 24, and so that the second series diode 22 is reversed biased and the second shunt diode 25 is forward biased when the high voltage control signal is applied to the second control node 26. The dc-dc converter 34 may be an isolated switching power supply, for example, and more particularly, an LTM8048 available from Linear Technology of Milpitas, Calif. The dc-dc converter 34 may be efficiently powered from a low voltage supply (not shown), for example, in the range of 3.3-12 volts.

The intermediate bias voltage $V_{shunt}$ may be less than 25% of the high voltage control signal (with respect to the high voltage control signal). For example, where the high voltage control signal HV is 200 volts, the intermediate base voltage $V_{shunt}$ may be less than 50 volts referenced negatively to the high voltage control signal. However, it may be particularly desirable that the intermediate bias voltage be less than 10 volts and, more particularly, 5 volts.

As will be appreciated by those skilled in the art, a low-voltage current loop is created at the high voltage potential (i.e., the high voltage control signal HV) which is power sourced from a low voltage rail or voltage source, for example, 3.3 volts. In other words, the intermediate bias voltage $V_{shunt}$ may be considered to be riding on or referenced to the high voltage control signal HV.

The switching circuit 20 also includes a first filter circuit 35 between the first shunt diode 23 and the dc-dc converter 34. Illustratively, the first filter circuit 35 includes a first inductor 36 and a first resistor 37 coupled in series. A second filter circuit 38 is between the second shunt diode 25 and the dc-dc converter 34. The second filter circuit also includes a second inductor 41 and a second resistor 42 coupled in series. Of course, other components may be included in each of the first and second filter circuits 35, 38, and additional filter circuits may also be included.

Additionally, a capacitor 45 may be coupled between the first control node 24 the first output port 32. A capacitor 46 may similarly be coupled between the second control node 26 and the second output port 33. Of course, additional capacitors or no capacitors may be coupled between the first and second control nodes 24, 26 and the first and second output ports 32, 33, respectively. A capacitor 47 may also be coupled to the input port 31. Another filter circuit 48 that may include a resistor 55 and inductor 56 coupled in series and collectively coupled to the input port 31. A voltage source 57, for example a low voltage source, may be coupled to the resistor 55.

Figure 3A:
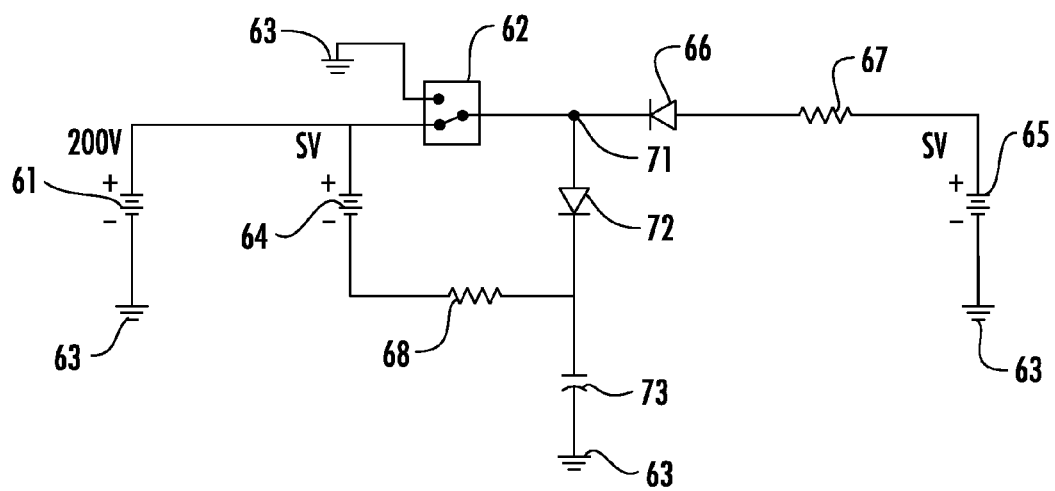
FIG. 3a is schematic circuit diagram illustrating exemplary operation of the switching circuit of FIG. 2.
Figure 3B:
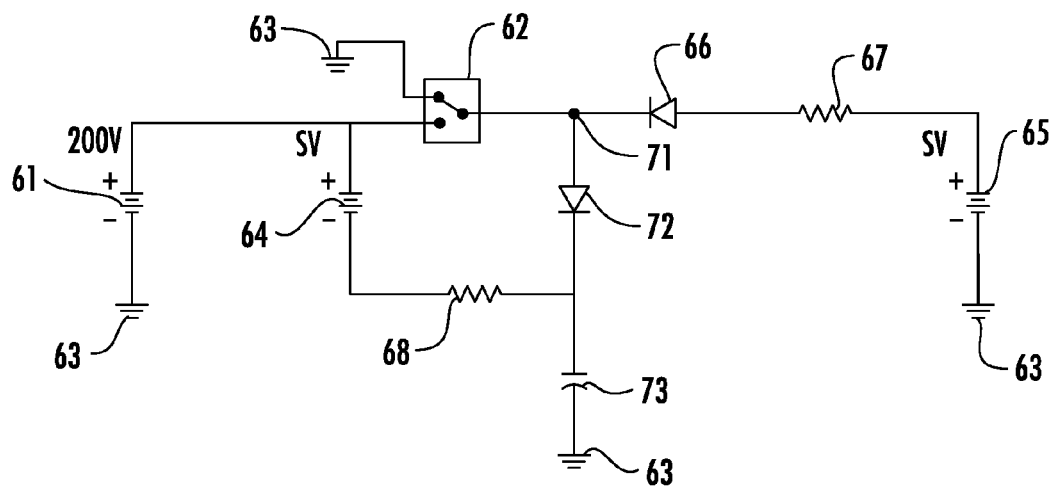
FIG. 3b is another schematic circuit diagram illustrating exemplary operation of the switching circuit of FIG. 2.

Referring now to FIGS. 3a and 3b, operation of the switching circuit 20 is illustrated by way of exemplary schematic diagrams. FIG. 3a is a schematic diagram illustrating the RF filter band being switched "off." In this circuit a first voltage source 61 generates 200V and is coupled to a single-pole double throw (SPDT) switch 62. The SPDT switch 62, for example, in the form of a push-pull driver or source-sink driver, switches between the 200V and a circuit reference 63 or ground. The series diode 66 and the shunt diode 72 are coupled to the SPDT switch 62 at a control node 71.

A second voltage source 64 generates 5V and is coupled to the output of the first power source so that the negative voltage terminal is 195 volts referenced to ground. A third voltage source 65 generates 5V. A second resistor 67 is coupled between the series diode 66 and the third voltage source 65. The second resistor 65 may be 50 Ohms, for example. A capacitor 73, for example, 1000 pF, is coupled to between the shunt diode 72 and the voltage reference 63. A first resistor 68, for example 50 Ohms, is coupled to the negative output of the second voltage source 64 and between the capacitor 73 and the shunt diode 72.

The series diode 66 is reverse biased, while the shunt diode 72 is forward biased. Particularly, the 5V generated by the third voltage source 65 is at the anode of the series diode 66 and 200V is at the cathode of the series diode when the SPDT switch 62 is configured to switch the first voltage source 61. This reverse biases the series diode 66. 195V is seen at the negative terminal of the second voltage source 64, while 200V is at the anode of the shunt diode 72. This creates a local 5V current loop whereby the shunt diode is forward biased. About 199.3V is seen at the junction between the shunt diode 72, the first resistor 68, and the capacitor 73.

FIG. 3b illustrates the circuit of FIG. 3a whereby the RF filter band is switched "on." In this arrangement, the SPDT switch 62 switches to the circuit reference 63 or ground. This generates 0V at the control node 71 and 195V at the negative terminal of the second voltage source 64. 195V is also seen at the junction between the shunt diode 72, the first resistor 68, and the capacitor 73. Thus, the shunt diode 72 is reverse biased. The 5V generated from the third voltage source is seen on the anode of the series diode 66, while 0V is seen on the cathode. Thus, the series diode 66 is forward biased. It should be noted that the shunt diode 72 is not truly grounded, but as will be appreciated by those skilled in the art, is floating at the capacitor 73.

A method aspect is directed to a method of using a switching circuit 20 that includes a first shunt diode 23 coupled to a first series diode 21 at a first control node 24 and a second shunt diode 25 coupled to a second series diode 22 at a second control node 26. The method includes generating an intermediate bias voltage $V_{shunt}$, from a dc-dc converter 34 cooperating with a high voltage supply 27, on the first and second shunt diodes 23, 25 so that the first series diode 21 is reversed biased and the first shunt diode is forward biased when a high voltage control signal HV is selectively applied to the first control node 24 by the high voltage supply and so that the second series diode 22 is reversed biased and the second shunt diode is forward biased when the high voltage control signal is selectively applied to the second control node 26.

As will be appreciated by those skilled in the art, in one prior art biasing technique, DC blocking capacitors are between each series and shunt diode. For a two band switch, for example, an additional two capacitors and two inductors are included. The distance between each shunt diode and series diode limits isolation at frequencies greater than 1 GHz. The layout becomes tight as multi-band switches concentrate all those parts at one junction. Additionally, two complementary high voltage source-sink drive outputs are used for each band, but there is no static drain in the high voltage supply. The capacitors decrease isolation, which is desirable particularly in high frequency applications (e.g., greater than 1 GHz). High performance packaged switch approaches generally cannot be used.

In another prior art biasing technique, the shunt diodes are forward biases off the high voltage supply. This configuration only uses one capacitor and one inductor per shunt diode as opposed to the DC blocking capacitor technique. The distance between the shunt diode and the series diode is thereby reduced by not having a capacitor therebetween, which increases isolation. Additionally, the high voltage DC power consumption significantly reduces battery life when used in portable radio, for example. Thus, there is a tradeoff between switch isolation and DC power consumption.

In contrast to the two prior art approaches described above, the switching circuit 20 consumes less power. The low voltage current loop, while existing at the high voltage potential, through the high-voltage drive path, does not consume high voltage current. Thus, one source-sink high voltage output is generally needed per band, which amounts to using half of the high voltage drivers compared to the prior art approaches. With respect to the reduced power consumption, with a 200V reverse bias, for example, about 4 watts may be saved in a single pole single throw switch with a 20 mA shunt diode bias current.

Still further, the switching circuit 20 provides improved high frequency performance. This is because the series and shunt diodes are not isolated by capacitors. Thus in some applications, isolation may be improved from 8 dB to 35 dB by changing discrete DC-blocked diodes to the packaged PIN diode approach described herein.

By reducing DC power consumption, when used in a portable radio or mobile wireless communications device, for example, battery life may be increased and less heat may be generated. Increased high frequency isolation may result in increased performance, particularly at frequencies greater than 1 GHz (lower harmonics and lower output path loss). Additionally, less parts are used (i.e., not DC blocking capacitors), which may translate to an easier layout of parts, more RF frequency bands for wide-band operation, increased DFM, and lower cost.

Many modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A switching circuit comprising:
  a first series diode;
  a second series diode;
  a first shunt diode coupled to said first series diode at a first control node;
  a second shunt diode coupled to said second series diode at a second control node;
  a high voltage supply configured to generate a high voltage control signal to be selectively applied to either the first or second control node; and
  a dc-dc converter cooperating with said high voltage supply to generate an intermediate bias voltage on said first and second shunt diodes so that said first series diode is reversed biased and said first shunt diode is forward biased when the high voltage control signal is applied to the first control node, and so that said second series diode is reversed biased and said second shunt diode is forward biased when the high voltage control signal is applied to the second control node.

2. The switching circuit of claim 1 wherein said first and second series diodes are coupled in back to back relation defining an input port therebetween; and further comprising a first output port coupled to said first control node for a first frequency band, and a second output port coupled to said second control node for a second frequency band different than the first frequency band.

3. The switching circuit of claim 1 wherein said dc-dc converter comprises an isolated dc-dc converter.

4. The switching circuit of claim 1 wherein the intermediate bias voltage is less than 25% of the high voltage control signal.

5. The switching circuit of claim 1 wherein the high voltage control signal is greater than 20 volts.

6. The switching circuit of claim 1 wherein said intermediate bias voltage is less than 10 volts.

7. The switching circuit of claim 1 wherein said first and second shunt diodes each comprises a PIN shunt diode.

8. The switching circuit of claim 1 wherein said first and second series diodes each comprises a PIN series diode.

9. The switching circuit of claim 1 wherein said first shunt diode and said first series diode are coupled in an anode-to-cathode configuration; and said second shunt diode and said second series diode are coupled in an anode-to-cathode configuration.

10. The switching circuit of claim 1 further comprising at least one first filter circuit between said first shunt diode and said dc-dc converter, and at least one second filter circuit between said second shunt diode and said dc-dc converter.

11. A switching circuit comprising:
a first PIN series diode;
a second PIN series diode;
a first PIN shunt diode coupled to said first PIN series diode at a first control node;
a second PIN shunt diode coupled to said second PIN series diode at a second control node;
a high voltage supply configured to generate a high voltage control signal to be selectively applied to either the first or second control node; and
an isolated dc-dc converter cooperating with said high voltage supply to generate an intermediate bias voltage on said first and second PIN shunt diodes so that said first PIN series diode is reversed biased and said first PIN shunt diode is forward biased when the high voltage control signal is applied to the first control node, and so that said second PIN series diode is reversed biased and said second PIN shunt diode is forward biased when the high voltage control signal is applied to the second control node.

12. The switching circuit of claim 11 wherein said first and second PIN series diodes are coupled in back to back relation defining an input port therebetween; and further comprising a first output port coupled to said first control node for a first frequency band, and a second output port coupled to said second control node for a second frequency band different than the first frequency band.

13. The switching circuit of claim 11 wherein the intermediate bias voltage is less than 25% of the high voltage control signal.

14. The switching circuit of claim 11 wherein the high voltage control signal is greater than 20 volts.

15. The switching circuit of claim 11 wherein said intermediate bias voltage is less than 10 volts.

16. The switching circuit of claim 11 wherein said first PIN shunt diode and said first PIN series diode are coupled in an anode-to-cathode configuration; and said second PIN shunt diode and said second PIN series diode are coupled in an anode-to-cathode configuration.

17. The switching circuit of claim 11 further comprising at least one first filter circuit between said first PIN shunt diode and said isolated dc-dc converter, and at least one second filter circuit between said second PIN shunt diode and said isolated dc-dc converter.

18. A method of using a switching circuit comprising a first shunt diode coupled to a first series diode at a first control node and a second shunt diode to a second series diode at a second control node, the method comprising:
generating an intermediate bias voltage, from a dc-dc converter cooperating with a high voltage supply, on the first and second shunt diodes so that the first series diode is reversed biased and the first shunt diode is forward biased when a high voltage control signal is selectively applied to the first control node by the high voltage supply and so that the second series diode is reversed biased and the second shunt diode is forward biased when the high voltage control signal is selectively applied to the second control node.

19. The method of claim 18 wherein the dc-dc converter comprises an isolated dc-dc converter.

20. The method of claim 18 wherein the intermediate bias voltage is generated to be less than 25% of the high voltage control signal.

21. The method of claim 18 wherein the high voltage control signal is greater than 20 volts.

22. The method of claim 18 wherein the intermediate bias voltage is generated to be less than 10 volts.

23. The method of claim 18 wherein the first and second shunt diodes each comprises a PIN shunt diode.

24. The method of claim 18 wherein the first and second series diodes each comprises a PIN series diode.

25. A switching circuit comprising:
a first series diode;
a first shunt diode coupled to said first series diode at a first control node;
a high voltage supply configured to generate a high voltage control signal be selectively applied to the first control node; and
a dc-dc converter cooperating with said high voltage supply to generate an intermediate bias voltage on said first shunt diode so that said first series diode is reversed biased and said first shunt diode is forward biased when the high voltage control signal is applied to the first control node, and so that said first series diode is forward biased and said first shunt diode is reverse biased when a voltage reference is applied to the first control node.

26. The switching circuit of claim 25 wherein said dc-dc converter comprises an isolated dc-dc converter.

27. The switching circuit of claim 25 wherein the intermediate bias voltage is less than 25% of the high voltage control signal.

28. The switching circuit of claim 25 wherein the high voltage control signal is greater than 20 volts.

\* \* \* \* \*